United States Patent [19]

Duckett et al.

[11] 4,061,818

[45] Dec. 6, 1977

[54] PRINTING BLANKET CONTAINING HIGH STRENGTH FILAMENTS

[75] Inventors: John C. Duckett, Clyde; Wayne W. Easley, Lake Junaluska; Andrew J. Gaworowski, Waynesville, all of N.C.

[73] Assignee: Dayco Corporation, Dayton, Ohio

[21] Appl. No.: 730,412

[22] Filed: Oct. 7, 1976

[51] Int. Cl.² ............ B32B 7/02; B32B 25/10; B32B 27/02; B32B 27/34

[52] U.S. Cl. ............ 428/246; 428/248; 428/252; 428/284; 428/287; 428/909

[58] Field of Search ............ 428/909, 284, 287, 246, 428/248, 252

[56] References Cited

U.S. PATENT DOCUMENTS

| | | | |
|---|---|---|---|
| 3,418,864 | 12/1968 | Ross | 428/909 |
| 3,652,376 | 3/1972 | Bowden | 428/909 |
| 3,676,282 | 7/1972 | Volmer | 428/909 |
| 3,700,541 | 10/1972 | Shrimpton et al. | 428/909 |
| 3,887,750 | 6/1976 | Duckett et al. | 428/909 |

OTHER PUBLICATIONS

DuPont Technical Information Bulletin K-1, "Kevlar," pp. 1-4, Dec. 1974.

*Primary Examiner*—J.C. Cannon
*Attorney, Agent, or Firm*—Reuben Wolk

[57] ABSTRACT

A printing blanket is provided which comprises a base ply, a printing face, and a high strength woven layer disposed between the base ply and the printing face with the woven layer being defined by warps and wefts wherein at least the warps are made of highly flexible synthetic filaments having a breaking tenacity ranging between 18 and 26 grams per denier and an elongation at break ranging between 3 and 5% with the blanket having optimum stability and minimum elongation under operating tension.

10 Claims, 6 Drawing Figures

PRINTING BLANKET CONTAINING HIGH STRENGTH FILAMENTS

BACKGROUND OF THE INVENTION

This invention relates to printing blankets and more particularly to printing blankets of the type used in offset lithographic printing.

In lithographic printing, a printing blanket is employed to transfer printing ink from a printing plate to n article such as paper, or the like, being printed and such printing blanket is operated under tension and brought into repeated contact with its associated printing plate and paper.

During ordinary usage of printing blankets, press operators tension such blankets over a substantial tension range which may vary from 25 pounds per inch of blanket width to as high as 100 pounds per inch even though in most applications 50 pounds per inch of width is recommended. However printing blankets proposed heretofore are deficient in that they are not capable of operating over a substantial range of blanket tension; and, when such blankets are operated near the high end of the above range of tensions they tend to become permanently stretched or deformed which causes a reduction in print quality. Another deficiency of printing blankets in common use is due to the utilization of fabric layers therein which are made entirely of materials which tend of wick solvents coming into contact with associated side edges of such blankets. Wicking is a difficult problem to solve because even though sealers are employed to prevent such wicking, the seal initially provided by a particular sealer is often broken during blanket use allowing solvents to penetrate the blanket and reach edges of fabric material in the blanket whereupon such material loses its properties, relaxes, and stretches thereby allowing the blanket to stretch.

SUMMARY

It is a feature of this invention to provide a simple and economical printing blanket which may be used in offset lithographic printing and which may be operated under tensions varying from as low as 25 pounds per inch of blanket width to as high as 100 pounds per inch of blanket width with minimum elongation and minimum adverse effect on print quality.

Another feature of this invention is to provide a printing blanket compised of a high strength layer of woven material wherein a major portion of such layer employs a yarm which provides minimum or no wicking of liquid coming into contact therewith.

Another feature of this invention is to provide a printing blanket of the character mentioned made of a plurality of layers laminated together as a unitary singlepiece construction and wherein such blanket may comprise as few as three layers.

Another feature of this invention is to provide a printing blanket of the character mentioned comprising a base ply, a printing face, and at least a high strength woven layer disposed between the base ply and printing face with the woven layer being defined by warps and wefts and wherein at least the warps are made of highly flexible synthetic filaments having a breaking tenacity ranging between 18 and 26 grams per denier and an elongation at break ranging between 3 and 5 percent with the blanket having optimum stability and minimum elongation under operating tension.

Accordingly, it is an object of this invention to provide a printing blanket having one or more of the novel features set forth above or hereinafter shown or described.

Other details, features, objects, uses, and advantages of this invention will become apparent from the embodiments thereof presented in the following specification, claims and drawing.

BREIF DESCRIPTION OF THE DRAWING

The accompanying drawing shows present preferred embodiments of this invention, in which FIG. 1 is a perspective view with parts in cross section, parts in elevation, and parts broken away illustrating one exemplary embodiment of a printing blanket of this invention;

DESCRIPTION OF ILLUSTRATED EMBODIMENTS

Figure 1:
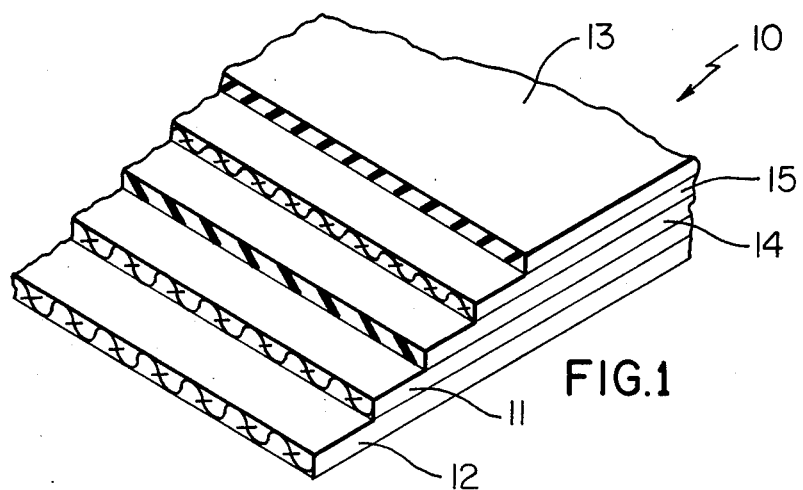

Reference is now made to FIG. 1 of the drawing which illustrates an exemplary blanket of this invention which is designated generally by the reference numeral 10 and such blanket has optimum dimensional stability and minimal elongation when operated under blanket tensions varying over a substantial range of the order of 25 pounds to 100 pounds per inch of blanket width. The blanket 10 is particularly adapted to be used in offset lithographic printing and has a unique high strength woven layer 11 which will be described in detail subsequently.

The blanket 10 comprises a base ply 12, a printing face 13, and at least the high strength woven layer 11 mentioned above disposed between the base ply and printing face; however, in the example of the invention illustrated in FIG. 1 of the drawing, the blanket 10 also has a so-called compressible layer 14 laminated against the top surface of the layer 11 and a reinforcing layer 15 laminated against the top surface of the layer 14 whereby the layers 14 and 15 are sandwiched between the printing face 13 and the high strength layer 11.

The woven layer 11 is defined by warps 16 and wefts 17 (see FIG. 2) wherein at least the warps 16 are made of high strength synthetic filaments. In particular, the warps 16 are preferably made of highly flexible synthetic filaments of aromatic polyamide having a breaking tenacity ranging between 18 and 26 grams per denier, an elongation at break ranging between 3 and 5 percent, and an initial modulus generally of the order of 475 grams per denier. The utilization of such a high strength material to define the warps 16 results in the blanket having optimum stability and minimum elongation under operating tensions.

Although any suitable material having the properties indicated above may be employed, one example of a material which may be used is in the form of yarn made from aramid fibers. Aramid is a generic fiber classification authorized by the United States Federal Trade Commission for an organic fiber within the family of aromatic polyamides. One example of a commercially available aramid yarn is sold under the registered trademark "Kevlar," by the E. I. DuPont de Nemours and Company Inc., of Wilmington, De.

Figure 2:
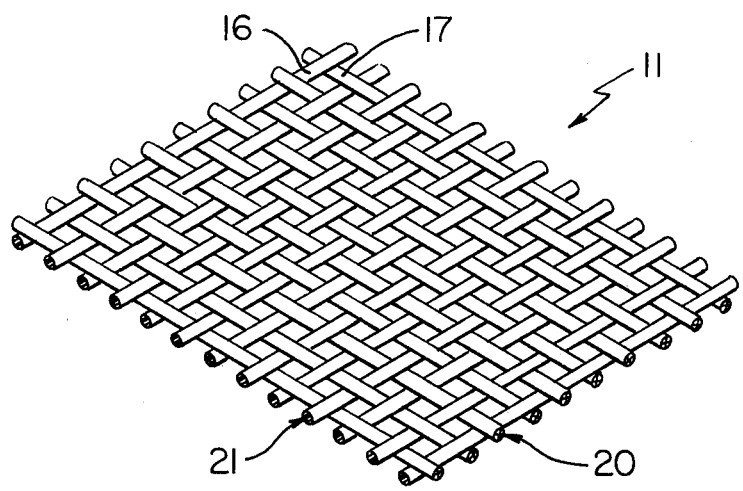
FIG. 2 is a perspective view particularly illustrating an exemplary high strength woven layer of the type which may be used in the blanket of FIG. 1 and wherein for convenience of drawing the same number of warps as wefts are shown across a particular unit of blanket length and width.

The blanket 10 is installed so that it is subjected to high tension forces in the direction of its warps 16 and it has been found that the wefts 17 of the layer 11 may be made of more commonly available materials such as materials having a breaking tenacity of about 12 grams per denier and less. For example, it has been found desirable in some applications to make the layer 11 employing cotton, rayon, or polyester to define the wefts 17. Accordingly, FIG. 2 of the drawing illustrates, by cross-hatching at 20, wefts 17 made of cotton and by cross-hatching at 21 warps 16 made of plastic in the form of aromatic polyamide. It will be noted that FIG. 2 shows the warps 16 and wefts 17 as being of the same size and the same in number for each unit of width and length respectively; however, this has been done for drawing convenience and in actual practice the number of wefts 17 made of cotton, rayon, or polyester would be roughly one-half the number of equal size warps 16 which reduces the crimp in the blanket 10. The use of particularly cotton or rayon to define the fill or wefts 17 of printing blanket 10 results in beter bonding of the layer 11 to rubber, due to the better bonding of cotton or rayon to rubber. In addition, cotton or rayon serves to cushion the aramid yarn which increases the overall compressability and smash resistance of the blanket.

Figure 3:
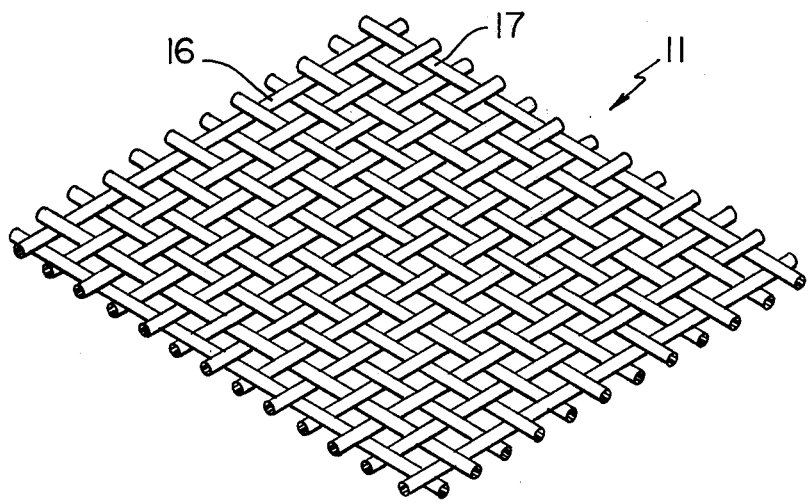
FIG. 3 is a view similar to FIG. 2 illustrating another exemplary embodiment of a woven strength layer.

As seen in FIG. 3 the layer 11 may also be made with its warps 16 and wefts 17 of the same synthetic plastic material and with the same number of warps 16 and wefts 17 per unit of width and length respectively. Accordingly, the wefts 17 of the layer 11 of FIG. 3 are made of material having the same breaking tenacity, elongation at break, and initial modulus as described in detail for the material defining the warps 16 of FIG. 2. The woven layer 11 of FIG. 3 may be used interchangeably with the layer 11 of FIG. 2 in the blanket 10 of FIG. 1.

The blanket 10 illustrated in FIG. 1 has been described as employing a compressible layer 14 and such compressible layer may be made utilizing any suitable technique known in the art. For example, such compressible layer may be a layer of the type disclosed in U.S. Pat. No. 3,887,750, for example. The blanket 10 of FIG. 1 also has the previously mentioned layer 15 and although such layer may be of any suitable type known in the art it is preferably a woven layer. The reinforcing layer 15 provides additional reinforcement for the blanket 10 as well as added stability for the printing face 13.

Having described the construction of the blanket 10 dimensions of a typical blanket will now be presented. In such a typical blanket, the base ply may have a thickness of 0.015 inch ± 0.003 inch, the high strength layer 11 may have a thickness ranging between 0.015 inch and 0.017 inch, the compressible layer may have a thickness ranging between 0.012 inch and 0.014 inch, the reinforcing layer 15 may have a thickness of 0.011 inch ± 0.003 inch, and the printing face 13 may have a thickness ranging between 0.012 inch and 0.015 inch.

Figure 4:
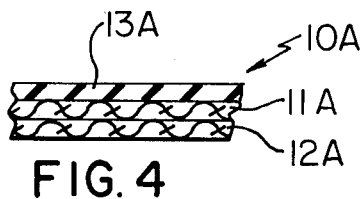
FIG. 4 is a fragmentary cross-sectional view illustrating another exemplary embodiment of the blanket of this invention.
Figure 5:
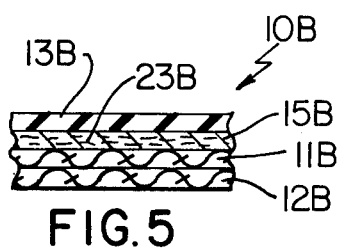
FIG. 5 is a fragmentary cross-sectional view similar to FIG. 4 illustrating still another exemplary embodiment of the blanket of this invention.

Other exemplary embodiments of the printing blanket of this invention are illustrated in FIGS. 4 and 5 of the drawing. The blankets illustrated in FIGS. 4 and 5 are similar to the blanket 10; therefore, such blankets will be designated by the reference numerals 10A and 10B respectively and representative parts of such blankets which are similar to corresponding parts of the blanket 10 will be designated in the drawing by the same reference numerals as in the blanket 10 (whether or not such representative parts are mentioned in the specification) followed by the letter designation A and not described again in detail.

The blanket 10A of FIG. 4 is preferably in the form of a three layer blanket comprised of a woven base ply 12A, a high strength layer 11A, and a rubber face 13A. The layer 11A may be made similar to the layer 11 of FIG. 2 or the layer 11 of FIG. 3 but layer 11A preferably is made similar to the layer of FIG. 3 having both its warps and wefts made of high strength aramid fibers. In the blanket 10A the printing face is built up to a desired thickness so that the overall thickness of the blanket is within the range of thicknesses of commercially available blankets.

The printing blanket 10B of FIG. 5 has a base ply 12B, a high strength woven layer 11B having both its warps and wefts made of aramid fibers, a reinforcing layer 15B, and a rubber face 13B. The reinforcing layer 15B is laminated against the high strength layer 11B with the printing face 13B being laminated against he reinforcing layer 15B and with the reinforcing layer 15B bonded against layer 11B it may be made of a comparatively less expensive non-woven material such as non-woven fibrous material as shown at 23B.

Figure 6:
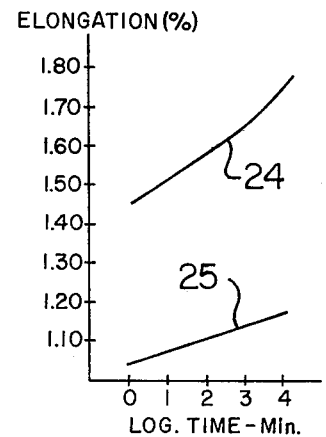
FIG. 6 is a graph showing the creep properties of a typical blanket of this invention when compared with a known widely used blanket.

The blanket of this invention is capable of being operated under tension forces varying from 25 pounds per inch of blanket width to 100 pounds per inch blanket width with minimum elongation; and, to highlight this fact, reference is made to FIG. 6 of the drawing which illustrates two plots of printing blanket elongation in percent versus log time in minutes. The plot shown by the line indicated at 24 is for a commercially available printing blanket which does not have a high strength layer such as the layer 11 of FIG. 1. The plot shown by the line at 25 is for the blanket of this invention. Each of the blankets tested and presented in FIG. 6 was subjected to a dead weight of 50 pounds per inch of blanket width and its elongation determined as a percent increase at various time intervals of 10; 100; 1,000; and 10,000 minutes.

The aramid fibers employed to define the high strength layer of the blanket of this invention do not tend to wick solvents or liquids coming into contact therewith whereby such blanket has optimum stability.

While present exemplary embodiments of this invention, and methods of practicing the same, have been illustrated and described, it will be recognized that this invention may be otherwise variously embodied and practiced within the scope of the following claims.

What is claimed is:

1. A printing blanket comprising, a base ply, a printing face, and a high strength woven layer disposed between said base ply and printing face, said woven layer being defined by warps and wefts wherein at least said warps are made of flexible synthetic filaments having a breaking tenacity ranging between 18 and 26 grams per denier and an elongation at break ranging between 3 and 5 percent, said layer having approximately half as many wefts as warps with the lesser number of wefts serving to reduce any tendency for crimping of said layer and blanket, said blanket having optimum stability and minimum elongation under operating tension.

2. A blanket as set forth in claim 1 in which said warps are made of aromatic polyamide filaments having said breaking tenacity and said elongation at break.

3. A blanket as set forth in claim 1 in which said wefts of said woven layer are made of a material having a breaking tenacity of less than 12 grams per denier.

4. A blanket as set forth in claim 3 in which each of said warps and wefts is of roughly the same cross-sectional size.

5. A blanket as set forth in claim 3 in which said wefts are made of cotton.

6. A blanket as set forth in claim 3 in which said wefts are made of rayon.

7. A blanket as set forth in claim 3 in which said wefts are made of polyester.

8. A blanket as set forth in claim 3 in which said woven layer adjoins said base ply and further comprising a compressible layer disposed between said woven layer and said printing face.

9. A blanket as set forth in claim 8 and further comprising a reinforcing layer disposed between said compressible layer and said printing face.

10. A blanket as set forth in claim 3 and further comprising a reinforcing layer disposed between said base ply and said printing face, said reinforcing layer being made of a non-woven fibrous material.

* * * * *